United States Patent

Finley

Patent Number: 5,242,094
Date of Patent: Sep. 7, 1993

[54] LADDER RACK

[76] Inventor: Alfred L. Finley, 2137 Hidden Creek Rd., Ft. Worth, Tex. 76107

[21] Appl. No.: 873,774

[22] Filed: Apr. 27, 1992

[51] Int. Cl.⁵ .................................................. B60R 9/00
[52] U.S. Cl. ................................... 224/324; 224/310; 182/127
[58] Field of Search ............... 182/127; 224/324, 310, 224/42.45 R, 317; 211/13

[56] References Cited

U.S. PATENT DOCUMENTS

| | | | |
|---|---|---|---|
| 3,722,766 | 3/1973 | Barrineau et al. | 224/324 |
| 3,888,398 | 6/1975 | Payne | 224/310 |
| 4,170,331 | 10/1979 | Faulstich | 224/324 |
| 4,262,834 | 4/1981 | Nutt | 224/324 |
| 4,390,117 | 6/1983 | Fagan | 182/127 X |
| 4,618,083 | 10/1986 | Weger, Jr. | 224/324 |
| 4,813,585 | 3/1989 | Nutt | 224/324 |
| 4,827,742 | 5/1989 | McDonald | 182/127 X |
| 5,058,791 | 10/1991 | Henriquez et al. | 224/324 X |

*Primary Examiner*—Blair M. Johnson
*Attorney, Agent, or Firm*—Herman H. Bains

[57] ABSTRACT

A portable ladder rack is formed of a pultrusion composite and is used to support a ladder on a vehicle truck body. The ladder includes a horizontal support frame and spaced apart leg structures. A hold down device effectively holds the ladder on the ladder rack against movement in any direction but the hold down device is shiftable to a release position to permit loading from the side or rear.

7 Claims, 1 Drawing Sheet

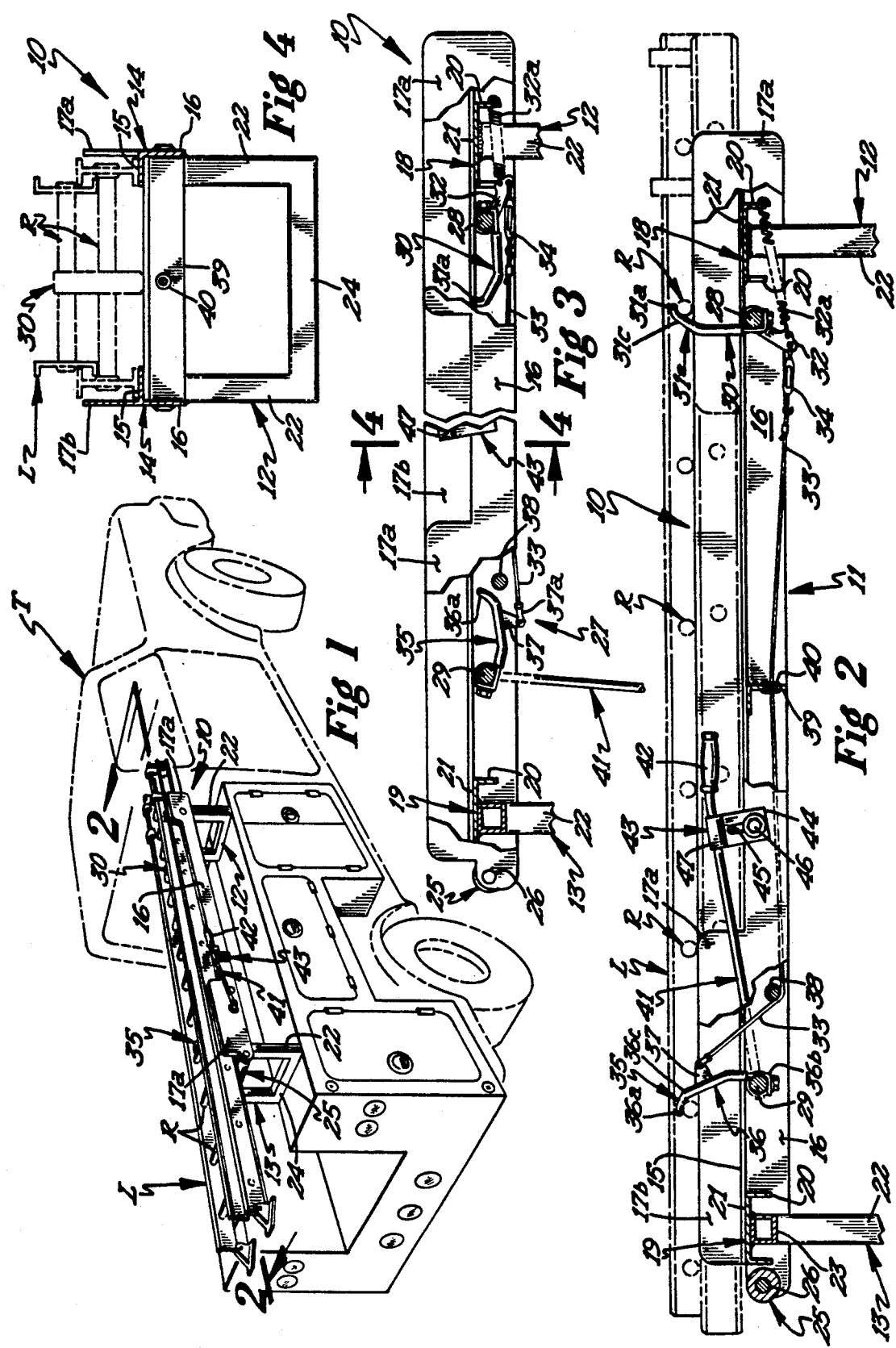

5,242,094

LADDER RACK

FIELD OF THE INVENTION

This invention relates to a ladder rack and more particularly to a vehicle-mounted ladder rack.

BACKGROUND OF THE INVENTION

There are commercial ladder racks which are mounted on vehicles, especially pick-up trucks, that permit ladders to be readily transported. Since many of these prior art ladder racks are formed of metal including steel, they are heavy and tend to rust or corrode. Further, some ladders are formed of fiber glass and these fiber glass ladders are sometimes damaged by sliding contact with the metal ladder racks. In some of the vehicle-mounted commercial ladder racks, loading and unloading of the ladder is available in one direction only (i.e. the rear). Finally, the hold down means of these prior art ladder racks are not effective in holding the ladders against movement in all directions.

SUMMARY OF THE INVENTION

An object of this invention is to provide a novel ladder rack, constructed of pultrusive composites, for use in supporting ladders on a vehicle, such as a pick-up truck.

More specifically, it is an object of this invention to provide a novel ladder rack for vehicles which is provided with a novel hold down means for releasably retaining the ladder against movement on the ladder rack.

The ladder rack includes a generally rectangular shaped support frame secured to a pair of longitudinally spaced apart transversely extending leg structures. A pair of longitudinally spaced apart shaft-mounted hold down members are provided and are interconnected by a cable. An actuating handle is secured to one of the shafts for shifting the hold down clamps between release and clamping positions. The ladder rack, when installed on a conventional pick-up truck, permits ready and easy loading of the ladder from the rear or from the side.

FIGURES OF THE DRAWING

FIG. 1 is a rear perspective view of the novel ladder rack mounted on a conventional pick-up truck;

FIG. 2 is a longitudinal cross-sectional view taken approximately along line 2—2 of FIG. 1 and looking in the direction of the arrows and;

FIG. 3 is a longitudinal cross-sectional view similar to FIG. 2 foreshortened but illustrated in the release position with the ladder removed, and FIG. 4 is a cross-sectional view taken approximately along line 4—4 of FIG. 3 and looking in the direction of the arrows.

DESCRIPTION OF THE PREFERRED EMBODIMENT

Referring now to the drawings and more particularly to FIG. 1, it will be seen that one embodiment of the novel ladder rack, designated by the generally reference numeral 10 is there shown.

It will be noted that the ladder rack 10 is mounted on the truck body of a conventional pick-up truck T. The ladder rack 10 includes a generally elongate rectangular support frame 11 which has a rectangular shaped front leg structure 12 secured thereto and a rectangular shaped rear leg structure 13 secured thereto and depending therefrom.

The support frame 11 is comprised of a pair of elongate parallel beams 14 which are of angled cross-sectional configuration including a horizontal flange 15 and a vertical flange including a depending flange portion 16 and an upstanding flange portion. The upstanding flange portion on the outer beam 14 is present only adjacent the ends of the outer beam 14, the central portion thereof being relieved. These upstanding vertical flange portions are designated 17a on the outer beam. The inner beam 14 (inside beam in FIG. 1) is provided with a continuous flange portion 17b. By having the upstanding flange portion 17a relieved throughout the major central portion of its length, a user may readily load or unload the ladder from the side of the ladder rack.

The longitudinal beams 14 are rigidly connected at their respected front and rear end portions by front transverse channel member 18 and the rear transverse channel member 19. In the embodiment shown, each front and rear channel member includes a pair of longitudinally spaced apart depending flanges 20 which are integral with a web element 21. It will be noted that the web element 21 engages the lower surface of the horizontal flange 15 of each longitudinal beam 14. The upper surface of the horizontal flanges defines a ladder supporting surface.

Each of the front and rear leg structures 12, 13, are comprised of a pair of transversely spaced apart vertical elements 22 which are rigidly interconnected at their respective upper ends by an upper horizontal leg element 23 and are interconnected at their respective lower ends by a lower horizontal leg element 24. In the embodiment shown, the front and rear leg elements are respectively rigidly secured to the front and rear channel members respectively. It will further be noted that the front and rear leg structures are spaced slightly inwardly from the ends of the support frame 11. It is also pointed out that the vertical dimension of the front leg structure 12 is slightly greater than the vertical dimension of the rear leg structure 13. In the embodiment shown, the difference in height of these leg structures is approximately three (3) inches thereby giving the rack a slight decline from front to rear.

Referring now to FIG. 2, it will be seen that the rear end portion of the support frame 11 is provided with an elongate transversely extending horizontal roller 25 having an axle 26 which is journaled in openings in the vertical depending flanges 16 of the longitudinal beams 14. This roller 25 facilitates loading the ladder on the ladder rack when the ladder is loaded from the rear. In this respect, the ladder will contact the roller 25 which will revolve as the ladder is pushed forwardly along the ladder supporting surface of the support frame. It will be noted that the over passing arc of rotation (upper circumferential surface portion) is disposed in substantially co-planar relation with respect to the upper surface of the web element 21 of the rear channel member 19.

The ladder rack 10 is also provided with a novel hold down device 27 which serves to hold a ladder positioned upon the ladder rack against movement in any direction. This hold down device 27 includes an elongate transverse front shaft 28 which extends through openings in the depending vertical flange portions 16 of the longitudinal beams 14 adjacent the front end thereof. In this regard, it will be noted that the front shaft 28 is located just rearwardly of the front channel member 18.

The hold down device 27 also includes an elongate transverse rear shaft 29 which extends between and is journaled in vertical flange portions 16 of the longitudinal beams 14 adjacent the rear end portion thereof. In the embodiment shown, it will be seen that the rear shaft 29 is located forwardly of the rear channel member 19. It will be noted that the front shaft 28 has an elongate clamping or hold down member 30 secured thereto and projecting therefrom. The hold down member 30 includes an angularly extending outer portion 31 which terminates in a terminal element 31a that extends angularly from the angular portion 31.

It will be noted that the hold down member 30 has a lower angular portion 31b secured to the central portion of the front shaft 28 by a bolt. It will further be noted that the hold down member 30 is provided with a plastic cover 31c to minimize damage to a ladder.

An extension element 32 is also secured to the shaft 28 and projects therefrom. The extension element 32 has an opening therein and one end of an elongate flexible cable 33 is connected to the opening in the extension element 32 by an adjustable turn buckle or clevis 34. The adjustable clevis 34 permits the cable 33 to be tension (shortened) or relaxed (lengthened). A helical spring 32a extends between and is connected to the extension element 32 and one of the depending flanges 20 of the front channel member 18. The other end portion of the elongate cable 33 is connected to an elongate rear clamping or hold down member 35 secured to the rear shaft 29 adjacent the mid-portion of the ladder. The rear hold down member 35 also has an outer angular portion 36 which terminates in angularly extending terminal element 36a.

The rear hold down member 35 also includes a lower angular portion 36b which is secured to the mid-portion of the shaft 29 by a bolt. The rear hold down member 35 is also provided with a plastic cover 36c to prevent damage to a ladder when the hold down device is in the retaining position.

An apertured attachment bracket 37 is secured to the rear hold down member 35 intermediate the ends thereof and a clevis 37a secures the cable 32 to the attachment bracket. It is pointed out that the cable 33 is preferably formed of a suitable metal and is coated with a vinyl cover.

An elongate transverse intermediate shaft 38 extends through openings in the vertical flanges 16 of the longitudinal beams 14 and is journaled therein. It will be noted that the intermediate shaft 38 is located forwardly of the rear shaft 29 and is located below the rear shaft 29 and below the front shaft 28. A horizontally disposed, transverse angle member 39 extends between and is secured to the beams 14 at approximately the mid-portion of the frame 11. The angle member 39 has a centrally located aperture therein which accomodates a grommet 40. The cable 33 extends through and is supported by the grommet 40. The front and rear shafts are disposed in substantially the same horizontal plane and this plane is located above the horizontal plane of the intermediate shaft 38 but below the opening in the grommet 40. It will be seen that the cable extends downwardly from the grommet 40 toward the extension element 32 and the intermediate shaft 38.

Means are provided for rotating front and rear shafts and their associated hold down members between release and hold down positions. This means includes an elongate handle 41 secured to the rear shaft 29 and projecting angularly therefrom. The handle 41 may be provided with a hand-grip element 42 to facilitate grasping thereof. The handle 41 can be shifted between a hold down position (FIG. 2) and a release position (FIG. 3).

Means are provided for retaining the handle in the hold down position, and this means includes an angle bracket 43 which is secured to one of the longitudinal beams 14 adjacent but forwardly of the intermediate shaft 38. The angle bracket 43 comprises a leg 44 secured to the outer longitudinal beam by a nut and bolt assembly 46 which projects through a slot 45 in leg 44 of the angle bracket and through an opening in the outer longitudinal beam. The angle bracket includes a horizontal leg (not shown) which extends angularly therefrom and serves to support the elongate handle 41 when the hold down device is in the hold down position. A vertical element 47 is secured to the horizontal leg of the angle bracket and serves to retain the handle in the hold down position.

When a user shifts the handle, from the release position (FIG. 3) to the locking or hold down position (FIG. 2), the rear shaft 29 and rear hold down member 35 are rotated and this motion is transmitted to the front hold down member 30 via the cable 33 and front shaft 37 to the simultaneously move the hold down members to hold down position. When the hold down members are in the release position, the hold down members will extend substantially horizontally from their associated shafts as illustrated in FIG. 3 below the plane of the ladder supporting surface of the support frame. When the hold down members are in the retaining or hold down position, the hold down members will engage rungs R of the ladder L to hold the ladder against movement in any direction as illustrated in FIG. 2.

When the handle 41 is shifted to the release position, the handle 41 is disengaged (moved outwardly) from the angle bracket and is rotated towards the release direction to rotate the front and rear clamping members downwardly and away from the rungs R of the ladder L. When the hold down device is in the hold down or locking position, the spring 32a will be tensioned, but when the hold down device is in the release position, the spring 32a will be relaxed and the handle 41 will hang vertically (FIG. 3).

The ladder rack is formed of a pultrusuion composite and the ladder rack is therefore light weight but structurally strong. A pultrusion composite consists of reinforcing materials, a laminating resin that binds the composite together and preferrably a surfacing mat to improve the surface appearance, chemical resistance and weather resistance. Other additives may also be used such as coloring agents, accelerations to cure the laminating resins, release agents, etc. In the preferred embodiment, the laminating resin is a polyunsaturated polyester resin. The reinforcing material is fiberglass strands and, when a surface mat is used, the mat is formed of fiberglass continuous strand mats.

In the embodiment shown, the ladder rack is formed of fiberglass laminated with polyester resin. The ladder rack is chemical and weather resistant and will not damage ladders which are slid along the rack during loading and unloading.

From the foregoing, it will be seen that I have provided a novel ladder rack, which is not only of simple and inexpensive construction but one which functions

What is claimed is:

1. A portable ladder rack for use in ladders on vehicles, including pick-up trucks having truck bodies, comprising, a horizontally disposed, elongate rectangular support frame including a pair of elongate, laterally spaced apart, substantially parallel means, each beam including a vertical flange and a horizontal flange extending the entire length of the beam, a pair of longitudinally spaced apart transverse members extending between and rigidly interconnecting said beams together adjacent the ends thereof, said horizontal flanges of the beams of the support frame defining a horizontal ladder-supporting planar surface for supporting a ladder thereon, a pair of generally rectangular shaped, longitudinally spaced apart, vertically disposed leg structures secured to said frame and extending transversely thereof and depending therefrom for attachment to the truck body of a pick-up truck, said support frame and leg structures being formed of a pultrusion composite comprising fiberglass fibers and a laminating resin, a hold down retaining device for releasably retaining a ladder on the support frame including a pair of longitudinally spaced apart elongate hold down members each having upper and lower ends, a pair of elongate longitudinal spaced apart shafts extending transversely of and journaled in the vertical flanges of said beams, each hold down member being rigidly connected to the central portion of one of said shafts for permitting shifting movement of the hold down members between hold down and release portions, said hold down members when in the hold down position being substantially vertically disposed to engage the rungs of a ladder on said support frame, said hold down members when in the release position being disposed below the ladder supporting surface of said frame, an extension element secured to the mid portion of one of said shafts and extending downwardly therefrom and a mechanism for shifting said hold down members between hold down and release positions including a yieldable elongate flexible cable having one end thereof connected to one of said hold down members intermediate the ends thereof and having its other end connected to said extension element on the shaft of the other hold down member, and a shiftable actuating member connected to the shaft of one of said hold down members whereby when said actuating member is shifted said hold down members will be shifted between the hold down and release positions.

2. Ladder rack as defined in claim 1 and a yieldable spring interconnected with said support frame and to said extension element, and an intermediate horizontal shaft journaled in said beams and located at a lower elevation than said shafts for said hold down members, said cable passing below and engaging said intermediate shaft.

3. The ladder rack as defined in claim 1 and an elongate transversely extending horizontal roller extending between and journaled on said beams at one end of said frame, the over passing arc of rotation of said roller being disposed substantially in the plane of the supporting surface of said support frame defined by said horizontal flanges.

4. The ladder rack as defined in claim 2 wherein hold down members and said cable and said spring are located in the longitudinal center line of the support frame.

5. The ladder rack as defined in claim 1 wherein said vertical flange for each beam extends above and below said horizontal flange.

6. The ladder rack as defined in claim 3 wherein one of said leg structures has a greater vertical dimension than the vertical dimension of the other leg structure, said leg structures having a width dimension corresponding substantially to the width dimension of said support frame.

7. The ladder rack as defined in claim 6 wherein the leg structure having the smaller vertical dimension is located adjacent said roller and is positioned adjacent the rear of the vehicle when the ladder rack is mounted on a vehicle.

* * * * *